United States Patent
DiPersia

(10) Patent No.: US 11,248,844 B2
(45) Date of Patent: Feb. 15, 2022

(54) PLANT CURING AND DRYING HANGER APPARATUS

(71) Applicant: Chase DiPersia, Windham, ME (US)

(72) Inventor: Chase DiPersia, Windham, ME (US)

( * ) Notice: Subject to any disclaimer, the term of this patent is extended or adjusted under 35 U.S.C. 154(b) by 169 days.

(21) Appl. No.: 16/743,465

(22) Filed: Jan. 15, 2020

(65) Prior Publication Data

US 2021/0215425 A1    Jul. 15, 2021

(51) Int. Cl.
    *F26B 25/00*    (2006.01)

(52) U.S. Cl.
    CPC ........ *F26B 25/003* (2013.01); *F26B 2200/22* (2013.01)

(58) Field of Classification Search
    CPC ...... F26B 25/00; F26B 25/22; F26B 2200/00; F26B 2200/22
    USPC .......................................................... 34/103
    See application file for complete search history.

(56) References Cited

U.S. PATENT DOCUMENTS

| | | | |
|---|---|---|---|
| 1,982,990 A | 12/1934 | Harris | |
| 2,455,684 A | 12/1948 | Kirkpatrick | |
| 3,154,335 A | 10/1964 | Mish, Jr. | |
| 3,967,578 A * | 7/1976 | Gallo | G01G 3/08 116/296 |
| 3,976,319 A | 8/1976 | Perry | |
| 4,019,767 A | 4/1977 | Edwards et al. | |
| 4,515,108 A * | 5/1985 | Rankin, Jr. | A01K 31/14 119/428 |
| 4,790,334 A | 12/1988 | Day, V et al. | |
| 5,168,642 A | 12/1992 | Hansen | |
| 5,651,193 A * | 7/1997 | Rhodes | F26B 17/122 34/531 |
| 5,802,764 A * | 9/1998 | Nucci | A01G 27/008 47/39 |
| D493,732 S * | 8/2004 | Youdelman | D10/56 |
| 8,316,582 B2 * | 11/2012 | Zweber | A01G 27/008 47/67 |
| 8,763,274 B2 * | 7/2014 | Fazion | F26B 25/18 34/661 |
| 10,327,389 B1 | 6/2019 | Brownscombe | |
| 10,357,803 B2 | 7/2019 | Greenwood | |
| 10,645,887 B2 * | 5/2020 | English | A01G 31/06 |
| 2015/0096189 A1 | 4/2015 | Hawes et al. | |
| 2019/0297781 A1 * | 10/2019 | Palmer | A01F 25/12 |
| 2020/0281122 A1 * | 9/2020 | Mor | B65G 59/067 |
| 2021/0215425 A1 * | 7/2021 | DiPersia | F26B 3/04 |

* cited by examiner

*Primary Examiner* — Stephen M Gravini
(74) *Attorney, Agent, or Firm* — Caseiro Burke LLC; Chris A. Caseiro

(57) ABSTRACT

A plant curing and drying hanger apparatus for use with harvested plant material which includes a primary frame, a plant support bar and one or more separators arranged to space from one another plant sections positioned on the support bar. The plant support bar is hingedly coupled to the primary frame. A latch releasably joins the plant support bar to one end of the primary frame so that an end of the plant support bar can be dropped away from the primary frame to enable the insertion and removal of plant sections into the spaces between adjacent separators to allow for effective plant drying and efficient loading and unloading of plant material without damaging the product.

5 Claims, 1 Drawing Sheet

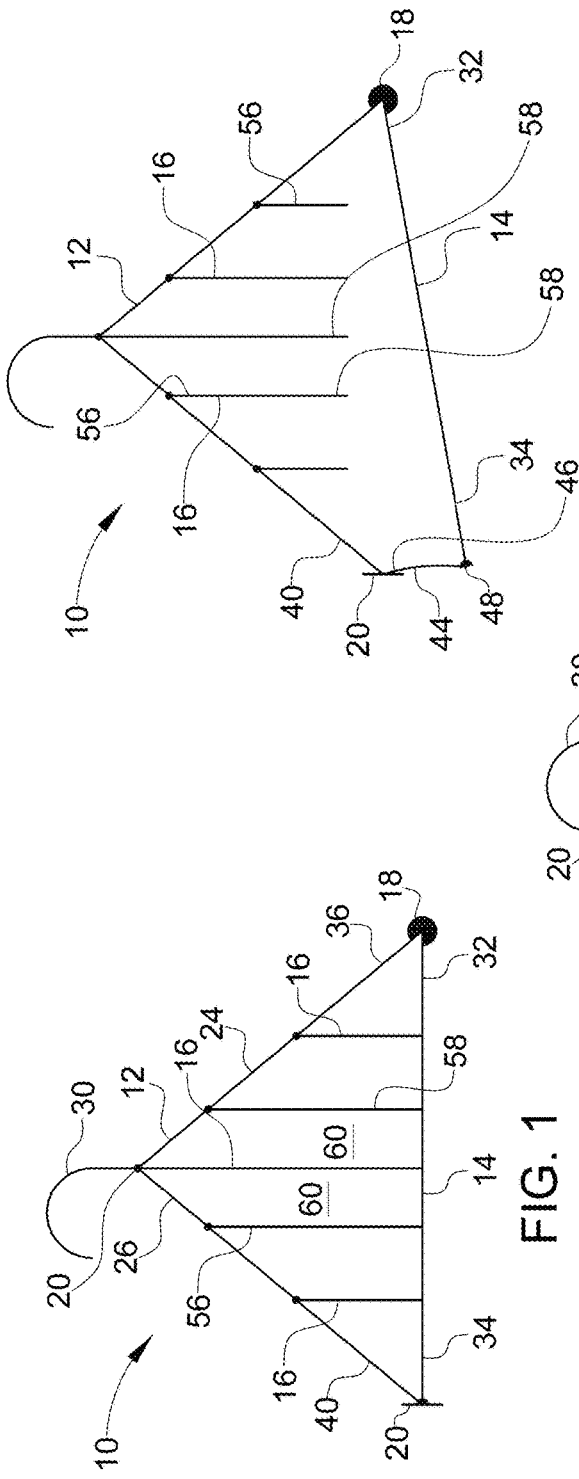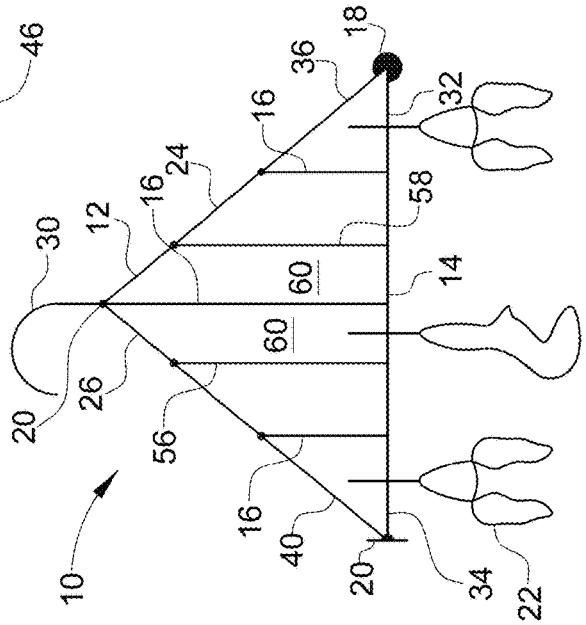

PLANT CURING AND DRYING HANGER APPARATUS

BACKGROUND OF THE INVENTION

1. Field of the Invention

The present invention relates to an apparatus that can be used to retain plant material in a position which facilitates drying or curing the plant. More specifically, the apparatus is a hanging apparatus used to facilitate the drying of plant material with a latching feature for easy loading and unloading of the plant material.

2. Description of the Prior Art

Drying and curing of plant material is not a new endeavor; however, prior art typically relates specifically to the drying and curing of tobacco plant material. Because the useful part of tobacco plants are the leaves, many of the existing drying and curing devices are designed specifically to protect and dry the leaves. As such, many of the existing drying and curing apparatuses have functionality to provide removable retainage of individual tobacco leaves or groups of tobacco leaves. Because these devices are primarily for use with leaves, they are not ideal for drying and curing all portions of the plant, such as new bud growth, for example.

Existing devices are not designed specifically for the drying and curing of new bud growth of plant material, and as such, many cultivators use ordinary plastic clothes hangers. Ordinary clothes hangers are also not ideally suited for drying and curing marijuana plant material specifically. A problem with using such conventional hangers is that the material used to make the hangers is not anti-microbial, anti-fungal, or anti-bacterial. Further, these hangers are not durable over multiple uses under the plant load expected and so there is an associated replacement cost. Additionally, clothes hangers lack separators to properly separate plant material. If plant material is not properly separated, it may create conditions which lead to mold, fungus, or bacteria growth that can ruin the harvested material. Additionally, ordinary hangers do not provide a method of removing dried plant material efficiently, or in a way that does not damage the product.

Specifically regarding the drying of marijuana plant material, towards the late stages and end cycle of flowering marijuana and other plant material cultivation, finished material typically requires proper drying and curing in order to properly complete product prior to consumer sale. Currently, the hang drying of such plants involves taking a section of plant comprising V-shaped branch limbs containing buds and leaves and placing the V-notch upside down to rest on the hanger bar so that the section hangs upside down. This arrangement is used to complete drying in order to retain proper flavor, taste, effect and visual appearance of finished product or material. If dried too slowly or with improper and high humidity, mold, fungus, bacteria and other pathogens and disease can infect hanging material. If this occurs, the plant material cannot be consumed safely and so it must be disposed of in such undesirable form. Unfortunately, generally and when air circulators are used to accelerate drying, it is not uncommon for at least some of a group of plant sections hanging upside down on the hanger bar to slide together so that they are no longer spaced in a way that enables adequate drying. Further, removal of the dried plant sections from the hanger bar can be difficult given their size and unbalancing on the bar that occurs.

A better hanging apparatus for plant material drying is needed. Such a plant hanging apparatus should be configured to enable plant drying with little to no microbe, fungus and/or bacteria growth on the drying plant material. Further, the hanging apparatus must be of sufficient structural integrity to be used repeatable with plant materials of all types including, but not limited to, marijuana plants. The apparatus should also be arranged to facilitate the hanging and removal of the plant material with minimal effort.

SUMMARY OF THE INVENTION

It is an object of the present invention to provide a better plant curing and drying hanger. Exposure to microbes, fungi, or bacteria during the drying process can lead to contamination of the product, making it less desirable or unusable. Providing proper conditions during the drying process is critical to producing a quality product. The hanger of the present invention provides a solution to limit the exposure to pathogens during the drying process.

It is another object of the present invention to provide adequate spacing between plant material. Inadequate spacing of the plant material during the drying process can lead to conditions which may extend the drying process or create high humidity zones, which can lead to mold, fungus, or bacteria growth. The present invention uses separators to ensure proper spacing between plants, thereby reducing the risk of creating high humidity zones where the plant materials are located.

It is a further object of the present invention to provide an efficient method of loading and unloading the plant material into and out of the plant curing and drying hanger without damaging the dried product during removal. Placing the product on a drying rack or ordinary hangers may be possible before the product has dried, however, it is difficult to remove the dried and brittle product without damaging it. Additionally, loading and unloading in this manner is time consuming and inefficient. The present invention provides a method of releasing the latch holding a plant support bar in place in such a fashion that facilitates easy removal by sliding the product on and off the bar without damaging the material.

BRIEF DESCRIPTION OF THE DRAWINGS

FIG. 1 is a front view of the plant curing and drying hanger apparatus of the present invention with the plant support bar in a latched position.

FIG. 2 is a front view of the apparatus with the plant support bar in an unlatched position.

FIG. 3 is a front view of the apparatus with plant sections spaced from one another on the plant support bar.

DETAILED DESCRIPTION OF THE INVENTION

A plant curing and drying hangar apparatus 10 of the present invention is shown in FIGS. 1-3. The apparatus includes a primary frame 12, a plant support bar 14, one or more plant separators 16, a hinge 18 and a latch 20. The apparatus 10 is arranged to enable sanitary drying of a plurality of plant sections 22 by keeping adjacent plant sections separated from one another so that they do not contact one another and thereby restrict the drying process. The apparatus 10 is further configured to enable the convenient placement and removal of plant sections thereon to reduce the time in that operation. The apparatus 10 is also configured to minimize plant damage after drying has occurred and during the plant section removal activity.

The components of the apparatus 10 may be made of the same or different materials. For example, one or more components may be made of metallic and/or nonmetallic material. The material or materials chosen to form the apparatus 10 may have one or more of anti-fungal, anti-microbial and anti-bacterial characteristics. The components of the apparatus 10 may be round or non-round structures. They may be solid, hollow or partially hollow.

The primary frame 12 includes a first frame member 24 and a second frame member 26. When the apparatus 10 is in a triangular configuration of the type commonly seen for conventional hangers, the first frame member 24 is joined to the second frame member 26 at location 28, which may be considered the peak or apex of the apparatus 10. A hanger hook 30 is affixed to the primary frame 12 at location 28. The hanger hook 30 may be used to lift the apparatus 10 above an underlying substrate such as a floor or a table, for example.

The plant support bar 14 includes a first end 32 and a second end 34. The first end 32 is hingedly coupled to end 36 of the first frame member 24 by hinge 18. The second end 34 of the plant support bar 14 is releasably retained to end 40 of the second frame member 26 by the latch 20. The latch 20 may be of any type sufficient to hold the second end 34 of the plant support bar 14 in contact with, or at least adjacent to, end 40 of the second frame member 26. A retention arm 44 includes a first end 46 attached to the second frame member 26 and a second end 48 attached to the second end 34 of the plant support bar 14. The retention arm 44 may be a rod, a chain, or another component. The retention arm 44 is configured to limit the extent to which the second end 34 of the plant support bar 14 is spaced from the end 40 of the second frame member 26 when the latch 20 is actuated to disengage the second end 34 of the plant support bar 14 from the end 40 of the second frame member 26. The plant support bar 14 is hinged and supports the plant sections 20 thereon while the apparatus 10 is hooked to a support located above an underlying substrate during a drying process.

Each of the one or more plant separators 16 includes a first end 56 and a second end 58. The first end 56 of each of the one or more plant separators 16 is affixed to either the first frame member 24, the second frame member 26 or at location 28 of the primary frame 12. The one or more plant separators 16 establish drying zones 60 therebetween and between the first and second frame members 24 and 26. That is, the plant separators 16 are arranged to keep at least upper portions 52 of the plant sections 20 from making physical contact with one another. That is, the plant separators 16 prevent plant sections 20 from clumping together on the apparatus 10. The number of separators 16 and their spacing from one another is selectable dependent on the size and drying needs of the plant material to be dried. The separators 16 limit the formation of high humidity zones between individual plants within the plant drying volume. The separators 16 may be solid or porous.

Each of the one or more plant separators 16 is formed having a length so that it extends from the point of affixation on the primary frame 12 to where the second end 58 is located adjacent to the plant support bar 14. Dependent on the spacing between the first and second frame members 24 and 26 to the plant support bar 14, the lengths of the separators 16 may be different. The separators 16 are selected or fabricated to be of sufficient stiffness so that pressure from a plant section in contact therewith will not dislodge the separator 16 enough to cause the plant section from one drying zone 50 to move into an adjacent drying zone 50. The separators 16 may be in the form of rods, bars or the like. The second end 48 of each of the separators 16 is not affixed to the plant support bar 14 so that when the latch 20 is actuated, the plant support bar 14 may swing away from the second frame member 26 while remaining affixed to the first frame member 24.

The apparatus 10 is used as follows. First, the latch 20 is actuated so that the second end 34 of the plant support bar 14 is disengaged from the end 40 of the second frame member 26. The extent of the separation of the two is dependent on the configuration of the retention arm 44. Space 52 is established by that action. With the plant support bar 14 spaced away from the second frame member 26, the plant sections 20 are hung on the plant support bar 14. Specifically, the plant sections 20 include two or more branches or limbs extending from one another to form a V-shape with crook 54. The "V" is inverted so that the crook 54 is in contact with the plant support bar 14, with the plant section 20 resting thereon. This step can be repeated one or more times with adjacent plant sections 20 spaced from one another on the plant support bar 14. The plant sections 20 are separated from one another so that when the plant support bar 14 is returned to a position at which the latch 20 is engaged, each plant section 20 is located within a drying zone 50 between adjacent separators 16. Drying may take place as desired, including by conditioning the air within the environment where the apparatus 10 is located. Upon completion of the drying process, the latch 20 is disengaged, and the plant support bar 14 drops down at an angle defined by the length of the retention arm 44 and the dried plant sections 20 can be allowed to slide down the angled plant support bar 14 or otherwise removed from the plant support bar 14 with little to no damage.

It is to be noted that the apparatus 10 is shown in the form of a modified conventional hanger of triangular shape. It is to be understood that the apparatus may be of a different shape, including of a three-dimensional form, without deviating from the invention.

Although an embodiment of the present invention has been described herein, the above description is merely illustrative. Further modification of the invention herein disclosed will occur to those skilled in the respective arts and all such modifications are deemed to be within the scope of the invention as defined by the appended claims.

What is claimed is:

1. A plant curing and drying hanger apparatus for improving the drying of plant sections, the apparatus comprising:
   a primary frame including a first frame member and a second frame member;
   one or more plant separators having a first end and a second end, wherein each of the one or more plant separators is affixed to either or both of the first frame member and the second frame member to form one or more drying zones therebetween;
   a plant support bar hingedly joined to the first frame member and releasably joined to the second frame member, wherein the plant support bar is arranged to removably retain one or more plant sections thereon within the one or more drying zones; and
   a latch arranged to releasably couple the plant support bar to the second frame member.

2. The apparatus of claim 1 further comprising a hanger hook coupled to the primary frame and arranged to enable suspension of the apparatus from a hanging device.

3. The apparatus of claim 1 fabricated of one or more anti-microbial, anti-bacterial, and anti-fungal materials.

4. The apparatus of claim 1 wherein the latch is a releasable clip.

5. The apparatus of claim 1 wherein the one or more plant separators are porous.

\* \* \* \* \*